United States Patent [19]
Iijima et al.

[11] Patent Number: 5,864,238
[45] Date of Patent: Jan. 26, 1999

[54] HIGH SPEED DYNAMIC RUN-OUT TESTING APPARATUS AND METHOD

[75] Inventors: Yasuo Iijima, Toyonaka; Yoshihiro Matsuda, Ono, both of Japan

[73] Assignee: Matsushita Electric Industrial Co., Ltd., Osaka, Japan

[21] Appl. No.: 890,675

[22] Filed: Jul. 9, 1997

[30] Foreign Application Priority Data

Jul. 10, 1996 [JP] Japan .................................. 8-180659

[51] Int. Cl.$^6$ .......................... G01R 31/06; G01R 31/34; G01B 7/31

[52] U.S. Cl. ......................... 324/545; 324/519; 324/772

[58] Field of Search ................... 324/501, 513, 324/519, 545, 772, 661, 662

[56] References Cited

U.S. PATENT DOCUMENTS

| | | | |
|---|---|---|---|
| 2,999,981 | 9/1961 | Probert | 324/545 |
| 4,456,874 | 6/1984 | Anderson | 324/545 |
| 5,134,378 | 7/1992 | Twerdochlib | 324/545 |
| 5,187,434 | 2/1993 | Ando | 324/772 |
| 5,262,717 | 11/1993 | Bolegoh | 324/772 |

*Primary Examiner*—Glenn W. Brown
*Attorney, Agent, or Firm*—McDermott, Will & Emery

[57] ABSTRACT

A high speed dynamic run-out testing apparatus includes a drive source rotatable at a high speed and having an output shaft, a main shaft coupled coaxially with the output shaft of the drive source, a non-contact bearing for rotatably supporting the main shaft in a non-contact fashion, a testpiece carrier shaft provided on one side of the main shaft remote from the drive source for supporting a cylindrical testpiece mounted on such testpiece carrier shaft, and a non-contact displacement detector for measuring a displacement of the cylindrical testpiece.

27 Claims, 3 Drawing Sheets

HIGH SPEED DYNAMIC RUN-OUT TESTING APPARATUS AND METHOD

BACKGROUND OF THE INVENTION 1. (Field of the Invention)

The present invention generally relates to the measurement of the dynamic roundness of a commutator employed in a commutator motor and, more particularly, to an apparatus for and a method of testing the commutator to evaluate the quality of the commutator as assembled.

2. (Description of the Prior Art)

One of the factors that are determinative of the lifetime of the commutator motor of a kind used in, for example, a vacuum cleaner is reliability of a commutator. If during a high speed rotation of the commutator motor the commutator encounters a trouble such as, for example, radial lift of one or some of the commutator segments and/or eccentricity of the commutator, one or both of brushes held in sliding contact with the commutator will instantaneously separate from their contact with the commutator segments a slight distance corresponding to deformation of the commutator from its design roundness, accompanied by generation of spark discharges which eventually accelerate reduction in lifetime of the commutator. Accordingly, it is feasible that even during the high speed rotation of the commutator motor, the commutator can retain a rigid stability and a design roundness throughout the entire design lifetime and, for this reason, the commutators as assembled must be properly tested or evaluated.

Hitherto, a so-called run-out test method has been known as one of various methods of testing the commutator to evaluate the quality of the commutator as assembled. The details of the known run-out test method will now be discussed with particular reference to FIGS. 4 and 5 which illustrate a rotation testing apparatus and a roundness measuring apparatus, respectively, both of which are necessitated to accomplish the prior art run-out test method.

As shown in FIG. 4, a commutator 11 to be tested is mounted on and fastened by means of a nut 10 to a stud shaft 9 for rotation together therewith. The stud shaft 9 is in turn coupled to a main shaft 4 by means of a releasable chuck 5. The main shaft 4 is rotatably supported by a plurality of, for example, two bearings 3 and is drivingly coupled with an electric drive motor 1 by means of a generally endless drive belt trained between and around step-up pulleys 2. In this testing machine, the commutator 11 to be tested is driven about the main shaft 4 at a speed within the range of 10,000 to 50,000 rpm depending on testing conditions.

In order to simulate an actual operating condition of the commutator in which the commutator is subjected to thermal stress, heated air is supplied by a heater-equipped fan 6 into a simulating chamber 7 enclosing the commutator 11 on the stud shaft 9 so that the commutator 11 to be tested can receive the thermal stress of a magnitude comparable to that that would be imposed on the commutator during actual rotation thereof. A thermometer 8 persistently monitors the temperature to keep the temperature inside the simulating chamber 7 within the range of 200° to 300° C.

The commutator 11 to be tested is tested under this condition for a predetermined length of time with the use of the rotation testing machine shown in FIG. 4, and the commutator 11 so tested is removed from the rotation testing machine and is then loaded in the roundness measuring machine shown in FIG. 5 after having been cooled to room temperatures.

The commutator 11 removed from the rotation testing machine is mounted on a tester shaft 22 of the roundness measuring apparatus which is supported by and extends between generally V-shaped blocks 21 and is driven by an electric drive motor 23 by means of a capstan roller 24 at a low speed. During the testing, an electric micrometer 25 is positioned adjacent the commutator 11 with a measurement probe thereof held in sliding contact with the commutator segments so that during rotation of the commutator 11 distortion and/or run-out of the commutator 11 from the design roundness can be measured by the measurement probe of the electric micrometer 25. A detection signal outputted from the electric micrometer 25 which is indicative of departure from the design roundness by reason of, for example, eccentricity of the commutator and/or radial lift of one or more of the commutator segments is, after having been amplified by an amplifier 26, recorded and/or displayed by a recorder 27.

In the practice of the prior art run-out test method discussed above, the rotation testing and the roundness measurement are different operations to be done separately and, therefore, the commutator 11 once subjected to the rotation test must be removed and is subsequently allowed to stand still for measurement of the residual strain. Because of this, the behavior of the commutator during a high speed rotation thereof cannot be assessed. Also, since vibration induced in the main shaft 4 when the latter is driven by the step-up pulleys 2 at a higher speed than that of the drive motor 1 and, also, vibration brought about by the bearings 3 on the main shaft 4 are both transmitted to the commutator 11 being tested, the commutator 11 being rotated together with the main shaft 4 undergoes fluctuation. Under these circumstances, no proper initial measurement condition is available and, therefore, it is not only difficult to evaluate the physical strength, but also to accomplish measurement of dynamic distortion and/or run-out of the commutator driven at a high speed.

Because of the reason discussed above, there is no way to ascertain the behavior of the commutator being tested and improvement in design of the commutator to increase the reliability is therefore limited. With the prior art system in which the thermal stress is applied to the commutator being tested, the hot air supplied from the fan 6 tends to be stirred up by a windage loss brought about by the high speed rotation of the commutator 11, making it difficult to retain the temperature at a predetermined value. In addition, complicated and time-consuming testing procedures have been required.

SUMMARY OF THE INVENTION

Accordingly, the present invention has been devised to eliminate the problems discussed above and is intended to provide a testing apparatus for and a testing method with which the dynamic roundness of a cylindrical testpiece then driven at a high speed can be measured with high accuracy.

To this end, the present invention provides a high speed dynamic run-out testing apparatus which comprises a drive source rotatable at a high speed and having an output shaft, a main shaft coupled coaxially with the output shaft of the drive source, a non-contact bearing for rotatably supporting the main shaft in a non-contact fashion, a testpiece carrier shaft provided on one side of the main shaft remote from the drive source for supporting a cylindrical testpiece mounted on such testpiece carrier shaft, and a non-contact displacement detector for measuring a displacement of the cylindrical testpiece. In this structure, since the drive source and the cylindrical testpiece are mounted on and are thus integrated together with the main shaft, a series of tests from the initial measurement to the rotation and roundness tests and then to a post-measurement can be carried out in situ while the testpiece is loaded on the rotation test apparatus and, therefore, any possible measurement error which would be brought about by vibration of the test shaft and/or the chuck can be avoided. Also, the support of the main shaft by means of the non-contact bearing system is effective to eliminate a vibration component brought about by bearings or the like and to allow the high speed drive to be accomplished under an ultra low vibration so that the dynamic physical distortion and oscillation of the commutator during the high speed rotation thereof can be measured with high accuracy.

Preferably, a non-contact displacement detector for measuring a displacement of the main shaft is employed. In this case, by subtracting the quantity of displacement during the high speed rotation of the main shaft from the quantity of displacement of the testpiece, the dynamic distortion and the oscillation of the testpiece itself can be measured with high accuracy.

Also preferably, the non-contact bearing is either an air bearing or a magnetic bearing. The use of the air bearing or the magnetic bearing is effective to eliminate a vibration component brought about by bearings or the like and to allow the high speed drive to be accomplished under an ultra low vibration so that the dynamic physical distortion and oscillation of the commutator during the high speed rotation thereof can be measured with high accuracy.

Where the non-contact displacement detector is of a type capable of detecting change in electrostatic capacitance between a sensor and the testpiece to measure the displacement, advantages can be appreciated that since the measurement is carried out in a non-contact fashion, the dynamic distortion and/or oscillation of the cylindrical testpiece can be measured during the high speed rotation.

In addition, if a laser Doppler displacement meter is used for the non-contact displacement detector, advantages can be appreciated that since the measurement is carried out in a non-contact fashion, the dynamic distortion and/or oscillation of the cylindrical testpiece can be measured during the high speed rotation.

The cylindrical testpiece referred to above may be a commutator including a plurality of commutator segments made of a material selected from the group consisting of copper and copper alloy, said commutator segments being cylindrically juxtaposed.

The present invention also provides a high speed dynamic run-out testing method which is carried out by the use of the high speed dynamic run-out testing apparatus of a kind described above. This method comprises the steps of rotating the cylindrical testpiece at a high speed, radiating a heat wave from an infrared radiating device to apply a thermal stress while the cylindrical testpiece is rotated at the high speed, and simultaneously therewith, measuring a radial displacement of the cylindrical testpiece by means of the non-contact displacement detector.

According to this method, when the thermal stress of a predetermined temperature is to be applied to the cylindrical testpiece, any possible change in temperature resulting from the windage loss of the cylindrical testpiece then rotated at a high speed can be eliminated and the heat quantity can be controlled by the applied voltage. Therefore, the high speed dynamic run-out test can be carried out with high accuracy at the stable preset temperature.

BRIEF DESCRIPTION OF THE DRAWINGS

The present invention will become readily understood from the following description of a preferred embodiment thereof made with reference to the accompanying drawings, in which like parts are designated by like reference numeral and in which.

DETAILED DESCRIPTION OF THE EMBODIMENT

Figure 1:
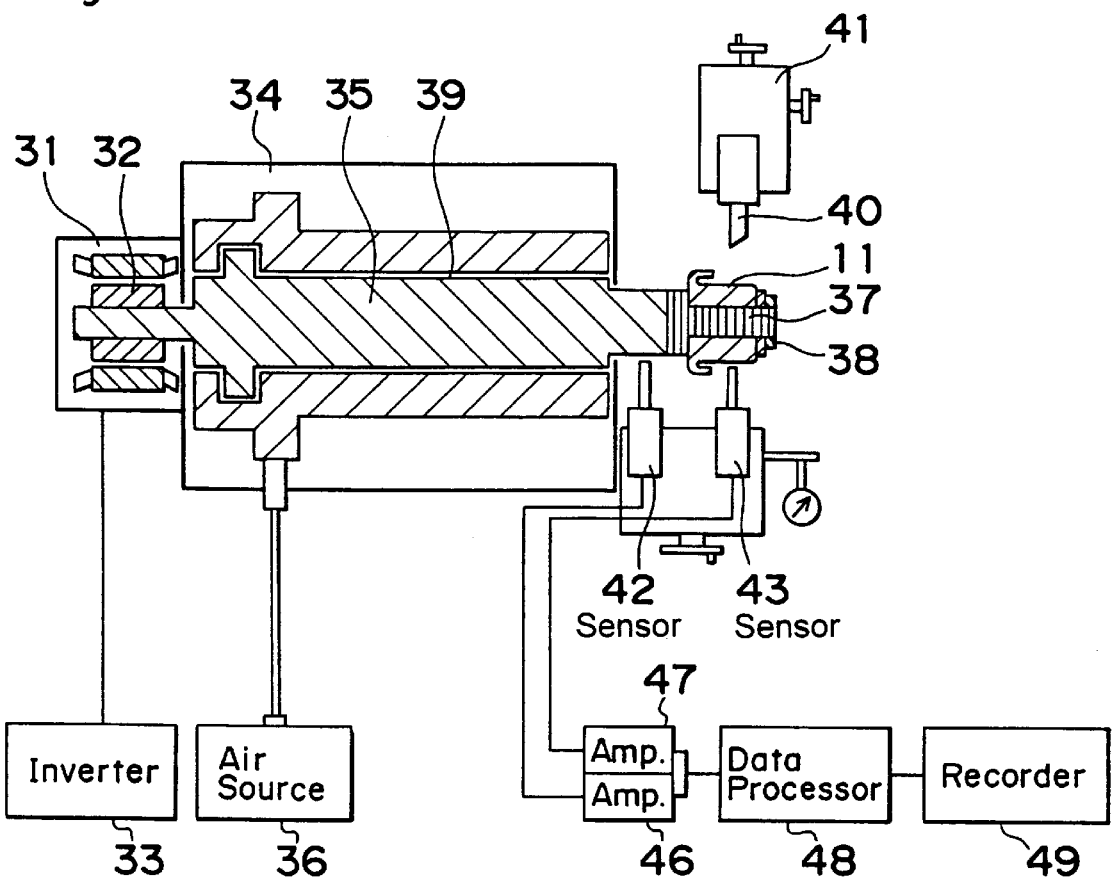
FIG. 1 is a schematic side sectional view of an apparatus for testing a commutator employed in the commutator motor to evaluate the quality of the commutator as assembled.

Referring first to FIG. 1, a roundness measuring apparatus shown therein comprises a variable speed drive motor 31 such as, for example, an invertor-controlled electric motor having a rotor 32 and operable to adjust the speed at which the commutator 11 to be tested is rotated, and an air bearing assembly 34 including an airborne shaft 35 which is, during operation of the roundness measuring apparatus, rotatably supported by a substantially cylindrical foil of air supplied thereinto from a compressed air source 36 so as to encircle that portion of the airborne shaft 35 within the air bearing assembly 34. The rotor 32 of the variable speed drive motor 31 is mounted on a left end of the airborne shaft 35 for rotation together therewith so that when the drive motor 31 is electrically energized the airborne shaft 35 can be driven in one direction about its own longitudinal axis.

A right end of the airborne shaft 35 extends outwardly from the air bearing assembly 34 and is formed into a stud shaft 37 that is used to support thereon a commutator 11 to be tested. The commutator 11 to be tested is mounted on the stud shaft 37 and is then fastened thereto by means of a fastening nut 38 so that the commutator 11 so mounted can rotate together with the airborne shaft 35. Although the stud shaft 37 is shown to be an integral part of the airborne shaft 35, it may be a member separate from, but coaxially connectable directly with the airborne shaft 35.

The roundness measuring apparatus also comprises a cutter carrier 41 carrying a cutter tool 40 mounted thereon for sliding movement in a direction towards and away from the commutator 11 mounted on the stud shaft 37, a non-contact displacement sensor 42 disposed adjacent the right end of the airborne shaft 35 for detecting the intrinsic oscillation of the airborne shaft 35 during the rotation of such shaft 35, and a non-contact displacement sensor 43 disposed adjacent the commutator 11 on the stud shaft 37 for detecting the eccentricity of the commutator 11 with respect to the longitudinal axis of the airborne shaft 35.

Each of the non-contact displacement sensors 42 and 43 may be of a type capable of detecting the corresponding parameter in terms of change in electrostatic capacitance between the sensor and the testpiece, that is, the commutator 11, or in the form of a laser Dopper displacement meter. Respective detection signals outputted from the non-contact displacement sensors 42 and 43 are, after having been amplified by associated amplifiers 46 and 47, supplied to a data processing device 48. The data processing device 48 is operable to subtract the quantity of displacement of the airborne shaft 35 with respect to the axis of rotation thereof from the quantity of radial displacement of the commutator 11 with respect to the axis of rotation thereof and then to output to a recorder 49 with a signal indicative of the quantity of radial displacement of only the commutator 11 with respect to the axis of rotation thereof.

While the roundness measuring apparatus of the present invention is so constructed as hereinabove described, the testing is performed in the following manner. Prior to the drive motor 31 being energized electrically, the commutator 11 to be tested has to be mounted on the stud shaft 37 for rotation together therewith. The drive motor 31 is subsequently energized to drive the airborne shaft 35 at a predetermined speed about its own longitudinal axis and an outer peripheral surface of the commutator 11 has to be ground by the cutter tool 40 to remove an initial deformation found on the outer peripheral surface of the commutator 11. Subsequently, while the commutator 11 is rotated at a certain predetermined speed together with the airborne shaft 35, the initial distortion of the commutator 11 and the oscillation of the airborne shaft 35 are detected respectively by the non-contact displacement sensors 42 and 43, the respective outputs from the non-contact displacement sensors 42 and 43 being, after having been amplified by the associated amplifiers 46 and 47, supplied to the data processing device 46 by which the quantity of radial displacement of the airborne shaft 35 is subtracted from the quantity of radial displacement of the commutator 11 to give an initial value of roundness of the commutator 11.

Thereafter, the variable speed drive motor 31 is electrically energized by an invertor 33 for a predetermined length of time to rotate at a high speed selected from the range of 10,000 to 50,000 rpm depending on a testing condition. While the airborne shaft 35 and, hence, the commutator is rotated at the high speed, the distortion of the commutator 11 and the oscillation of the airborne shaft 35 are again detected respectively by the non-contact displacement sensors 42 and 43, the respective outputs from the non-contact displacement sensors 42 and 43 being, after having been amplified by the associated amplifiers 46 and 47, supplied to the data processing device 46 by which the quantity of radial displacement of the airborne shaft 35 that took place during the high speed rotation is subtracted from the quantity of radial displacement of the commutator 11 that took place during the high speed rotation to thereby give a value of roundness of the commutator 11 during the high speed rotation. By so doing, the behavior of the commutator during the high speed rotation can be examined in reference to the initial radial displacement of the commutator 11 rotated at the low speed and the radial displacement of the commutator 11 rotated at the high speed.

Considering that in the present invention the variable speed drive motor 31 and the commutator 11 are integrated together with the shaft 35, the commutator being tested is not adversely affected by fluctuation of the shaft and/or misalignment of the commutator with the chuck such as experienced with the prior art and can be driven at a high speed under a minimized oscillation. In addition, since the variable speed drive motor 31 is integrated together with the shaft 35, that is, the drive motor 31 makes use of one end of the shaft 35 as its drive shaft, the use of the plural bearings for the support of the shaft such as necessitated in the prior art apparatus is advantageously dispensed with.

The use of the air bearing assembly in which the shaft 35 can be rotatably supported by the cylindrical foil of air supplied from the compressed air source is particularly advantageous in that the shaft 35 then rotated will undergo vibration which tends to be induced when ball bearings are employed, making it possible to accomplish extremely stable measurement at a high speed rotation. In addition, since removal of the initial distortion and a series of rotation test and measurement of the commutator are successively carried out while the commutator 11 is mounted on the stud shaft 37 which is an integral part of the shaft 35, vibratory factors such as found during mounting on the test shaft and the chuck found in the prior art and the error in setting during the measurement can advantageously be eliminated and, therefore, an extremely stabilized measurement is possible. The use of the non-contact displacement sensor 42 is particularly advantageous in that the behavior of the commutator 11 can be accurately measured without being disturbed by an external factor by detecting the intrinsic oscillation of the shaft 35 during the high speed rotation thereof and subtracting it from the measured quantity of displacement of the commutator 11.

Figure 2A:
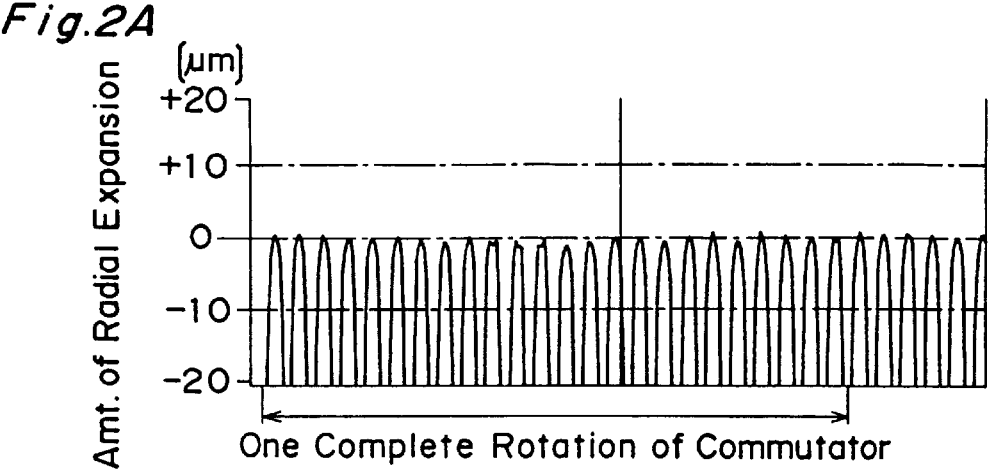
FIG. 2A is a graph showing the waveform of an output signal from a roundness sensor given when a commutator is driven at a low speed.
Figure 2B:
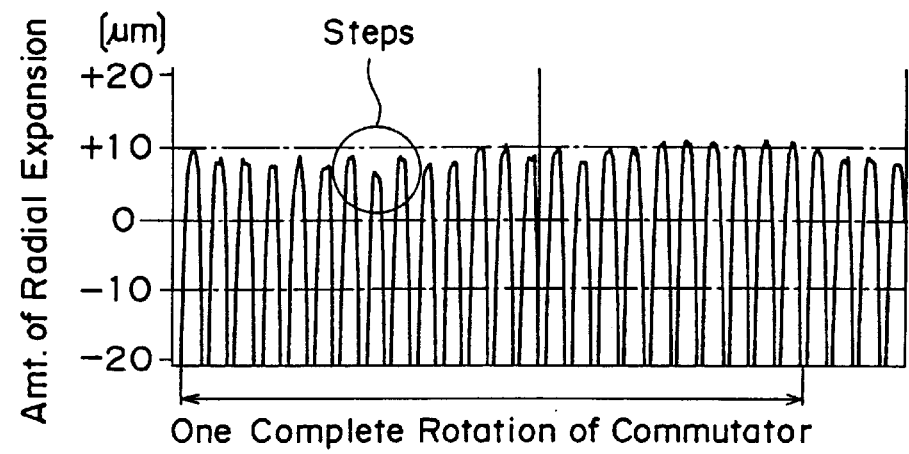
FIG. 2B is a graph showing the waveform of an output signal from the roundness sensor given when the commutator is driven at a high speed.
Figure 2C:
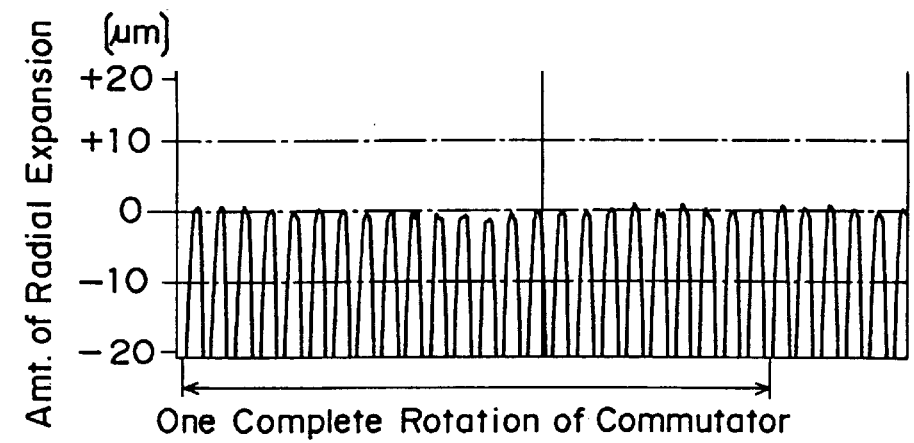
FIG. 2C is a graph showing the waveform of an output signal from the roundness sensor given when the speed of rotation of the commutator once driven at the high speed was lowered down to the lower speed.
Figure 4:
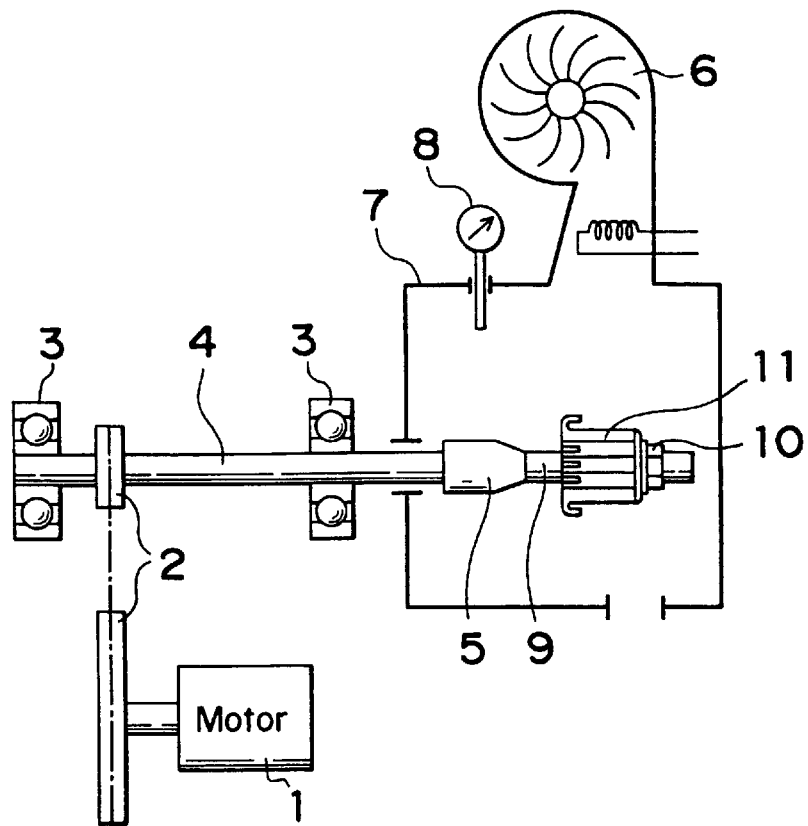
FIGS. 4 and 5 are schematic diagrams showing the prior art rotation testing apparatus and the prior art roundness measuring apparatus, respectively, both of which are necessitated to accomplish the prior art run-out test method.
Figure 5:
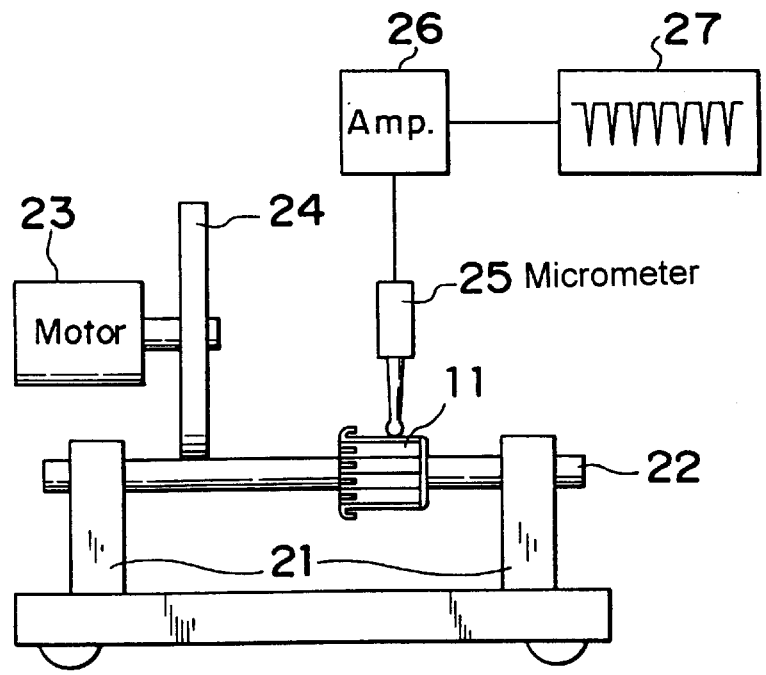

FIG. 2A illustrates the measured waveform representative of the quantity of radial displacement during the initial test condition in which the commutator was subjected to a rotation test at a low speed of 5,000 rpm. FIG. 2B illustrates the measured waveform representative of the quantity of radial displacement during the condition in which the commutator 11 was subjected to a rotation test at a high speed of 40,000 rpm. FIG. 2C illustrates the measured waveform representative of the quantity of radial displacement exhibited when the speed of rotation of the commutator 11 was lowered down to the initial condition of 5,000 rpm. In these figures, the single spike in the waveform represents the presence of one commutator segment.

While as shown in FIG. 2A the quantity of the radial displacement of the commutator 11 during the initial test condition was at a level of the standard value, the commutator 11 when driven at the high speed had its outer peripheral surface expanding radially outwardly under the influence of a centrifugal force or the like with the quantity of the radial displacement consequently increased as shown in FIG. 2B. Considering that the commutator segments are circumferentially juxtaposed with a space provided between each neighboring commutator segments, the high speed rotation of the commutator 11 resulted in the commutator segments displaced radially outwardly in varying distances as can readily be understood from irregular peak values in FIG. 2B. However, as shown in FIG. 2C, when the speed of rotation of the commutator 11 was lowered down to the initial speed of 5,000 rmp, the displacement measured returned to that during the initial condition shown in FIG. 2A.

Thus, the graphs of FIGS. 2A to 2C make it clear that the dynamic behavior of the commutator such as radial expansion, oscillation and presence or absence of steps among the commutator segments which are found during the high speed rotation of the commutator 11 and which have hitherto been difficult to measure can be measured accurately.

Figure 3:
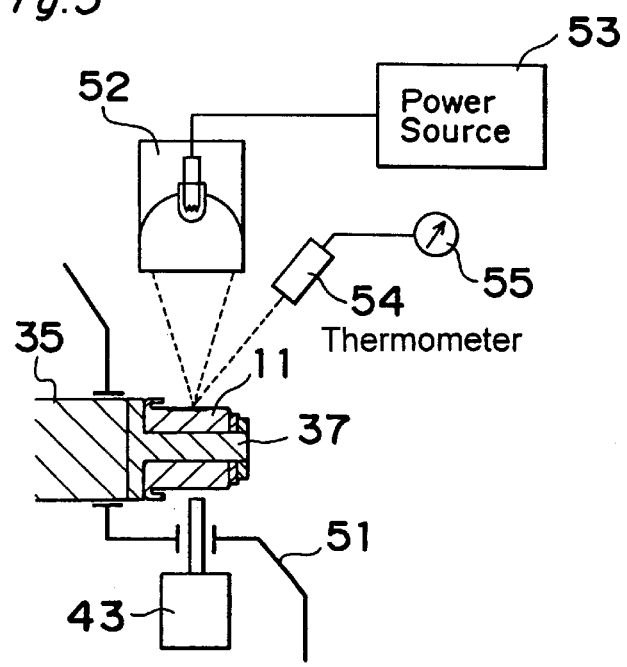
FIG. 3 is a schematic diagram showing the manner in which a thermal stress is applied to the commutator being tested.

It is to be noted that in the foregoing description reference has been made to the use of the air bearing assembly. However, similar effects can be obtained even when any other non-contact bearing system such as a magnetic bearing is employed. Where the magnetic bearing is employed, no compressed air source is needed.

Where it is needed to simulate an actual operating condition of the commutator, a thermal stress is applied to the commutator 11 being tested in the manner which will now be described with reference to FIG. 3. As shown in FIG. 3, a thermal stress applying heat source comprises a halogen lamp 52, and the quantity of heat emitted from the halogen lamp 52 is controlled by an electric power source 53. In such case, the non-contact displacement sensor 43 is protected by a heat shielding plate 51. An infrared thermometer 54 is employed to measure the temperature of that portion of the commutator 11 which is being illuminated. The temperature so measured by the thermometer 54 is visually presented by a temperature indicator 55.

Where the hot air is employed to apply the thermal stress to the commutator being tested such as in the prior art, the preset temperature tends to fluctuate by the effect of the windage loss brought about by the high speed rotation of the commutator. In contrast thereto, heat radiation by the use of the halogen lamp 52 which provides light energies is effective to keep the commutator 11 at a preset temperature without being adversely affected by the windage loss. Considering that the quantity of heat emitter from the halogen lamp 52 can be finely adjusted by the power source 53, it is possible to instantaneously increase the temperature of the commutator 11 being tested to the preset value and, once it has been increased to the preset value, a stable temperature control is possible.

Also, since only the commutator 11 being tested can be heated, neither is the use of a chamber necessary, nor the temperature inside the chamber need be increased, accomplishing an energy-saving along with reduction in length of time required to set the preset temperature. Moreover, while in the prior art the temperature of the commutator being tested has been estimated by a thermometer such as a thermocouple for detecting the temperature inside the chamber, the present invention makes use of the infrared thermometer 54 to detect directly the temperature of the commutator 11 being tested under the high speed rotation on a non-contact basis. Accordingly, not only can the more accurate temperature be detected, but also the temperature control on an automated control system can easily be accomplished, making it possible to apply the highly stabilized thermal stress to the commutator being tested.

From the foregoing description of the present invention, it has now become clear that the high speed dynamic roundness measuring apparatus and the high speed dynamic roundness measuring method both according to the present invention have many advantages. Specifically, since the variable speed drive motor for adjusting the speed of rotation of a cylindrical testpiece such as the commutator and the testpiece are integrated together with the shaft, a series of tests from the initial measurement to the rotation and roundness tests and then to a post-measurement can be carried out in situ while the commutator is loaded on the rotation test apparatus and, therefore, any possible measurement error can be avoided. Also, the support of the shaft by means of the non-contact bearing system is effective to eliminate a vibration component brought about by ball bearings or the like and to allow the high speed drive to be accomplished under an ultra low vibration so that the dynamic physical distortion and oscillation of the commutator during the high speed rotation thereof can be measured with high accuracy.

By employing the design in which the quantity of displacement during the high speed rotation of the shaft is measured and is then subtracted from the quantity of displacement of the commutator, the dynamic distortion and the oscillation of the commutator itself can be measured with high accuracy. Also, the use of the system in which the heat wave emitted from an infrared radiating device is applied to the commutator, any possible change in heating temperature which would result from the windage loss can be suppressed and the fine control of the heat quantity with the applied voltage makes it possible to perform a high speed run-out test at the preset temperature.

Although the present invention has been described in connection with the preferred embodiments thereof, it should be noted that various changes and modifications are apparent to those skilled in the art. Accordingly, such changes and modifications so far as encompassed by the appended claims are to be understood as included within the scope of the present invention.

What is claimed is:
1. A high speed dynamic run-out testing apparatus which comprises:
 a drive source rotatable at a high speed and having an output shaft;
 a main shaft coupled coaxially with the output shaft of the drive source;
 a non-contact bearing for rotatably supporting the main shaft in a non-contact fashion;
 a testpiece carrier shaft provided on one side of the main shaft remote from the drive source for supporting a cylindrical testpiece mounted on such testpiece carrier shaft; and
 a first non-contact displacement detector for measuring a displacement of the cylindrical testpiece.

2. The apparatus as claimed in claim 1, further comprising a second non-contact displacement detector for measuring a displacement of the main shaft.

3. The apparatus as claimed in claim 1 or 2,
 wherein the non-contact bearing is an air bearing.

4. The apparatus as claimed in claim 1 or 2,
 wherein the non-contact bearing is a magnetic bearing.

5. The apparatus as claimed in claim 2,
 wherein the second non-contact displacement detector is of a type capable of detecting change in electrostatic capacitance between a sensor and the main shaft to measure displacement.

6. The apparatus as claimed in claim 2,
 wherein the second non-contact displacement detector is a laser Doppler displacement meter.

7. The apparatus as claimed in claim 2,
 wherein the first non-contact displacement detector is of a type capable of detecting change in electrostatic capacitance between a sensor and the cylindrical testpiece to measure displacement, and
 wherein the second non-contact displacement detector is of a type capable of detecting change in electrostatic capacitance between a sensor and the main shaft to measure displacement.

8. The apparatus as claimed in claim 2,
 wherein the first non-contact displacement detector is a laser Doppler displacement meter, and
 wherein the second non-contact displacement detector is a laser Doppler displacement meter.

9. The apparatus as claimed in claim 1,
 wherein the first non-contact displacement detector is of a type capable of detecting change in electrostatic capacitance between a sensor and the cylindrical testpiece to measure displacement.

10. The apparatus as claimed in claim 1,
wherein the first non-contact displacement detector is a laser Doppler displacement meter.

11. The apparatus as claimed in claim 1,
wherein the cylindrical testpiece is a commutator including a plurality of commutator segments made of a material selected from the group consisting of copper and copper alloy, said -commutator segments being cylindrically juxtaposed.

12. A high speed dynamic run-out testing apparatus which comprises:

a drive source rotatable at a high speed and having an output shaft;

a main shaft coupled coaxially with the output shaft of said drive source;

a non-contact bearing for rotatably supporting said main shaft in a non-contact fashion, wherein said non-contact bearing is an air bearing;

a testpiece carrier shaft provided on one side of said main shaft remote from the drive source for supporting a cylindrical testpiece mounted on such testpiece carrier shaft; and a first non-contact displacement detector for measuring a displacement of the cylindrical testpiece.

13. The apparatus as claimed in claim 12,
wherein the first non-contact displacement detector is of a type capable of detecting change in electrostatic capacitance between a sensor and the cylindrical testpiece to measure displacement.

14. The apparatus as claimed in claim 12,
wherein the cylindrical testpiece is a commutator including a plurality of commutator segments made of a material selected from the group consisting of copper and copper alloy, said commutator segments being cylindrically juxtaposed.

15. The apparatus of claim 12, further comprising:

a radiation type heating source for heating said cylindrical testpiece; and an infrared type temperature detection element for detecting the temperature of said cylindrical testpiece.

16. The apparatus as claimed in claim 12,
further comprising a second non-contact displacement detector for measuring a displacement of the main shaft.

17. The apparatus as claimed in claim 16,
wherein the second non-contact displacement detector is a laser Doppler displacement meter.

18. The apparatus as claimed in claim 16
wherein the first non-contact displacement detector is of a type capable of detecting change in electrostatic capacitance between a sensor and the cylindrical testpiece to measure displacement, and
wherein the second non-contact displacement detector is of a type capable of detecting change in electrostatic capacitance between a sensor and the main shaft to measure displacement.

19. The apparatus as claimed in claim 16,
wherein the first non-contact displacement detector is a laser Doppler displacement meter, and
wherein the second non-contact displacement detector is a laser Doppler displacement meter.

20. The apparatus as claimed in claim 16,
wherein the second non-contact displaced detector is of a type capable of detecting change in electrostatic capacitance between a sensor and the main shaft to measure displacement.

21. A high speed dynamic run-out testing apparatus which comprises:

a drive source rotatable at a high speed and having an output shaft;

a main shaft coupled coaxially with the output shaft of said drive source;

a non-contact bearing for rotatably supporting said main shaft in a non-contact fashion;

a testpiece carrier shaft provided on one side of said main shaft remote from the drive source for supporting a cylindrical testpiece mounted on such testpiece carrier shaft; and a first non-contact displacement detector for measuring a displacement of the cylindrical testpiece, wherein said first non-contact displacement detector is a lash Doppler displacement meter.

22. The apparatus as claimed in claim 21,
wherein the cylindrical testpiece is a commutator including a plurality of commutator segments made of a material selected from the group consisting of copper and copper alloy, said commutator segments being cylindrically juxtaposed.

23. The apparatus of claim 21, further comprising:

a radiation type heating source for heating said cylindrical testpiece; and a radiation type temperature detection element for detecting the temperature of said cylindrical testpiece.

24. The apparatus as claimed in claim 21, further comprising a second non-contact displacement detector for measuring a displacement of the main shaft.

25. The apparatus as claimed in claim 24,
wherein the second non-contact displacement detector is a laser Doppler displacement meter.

26. The apparatus as claimed in claim 24,
wherein the second non-contact displacement detector is of a type capable of detecting change in electrostatic capacitance between a sensor and the main shaft to measure displacement.

27. A high speed dynamic run-out testing method which is carried out by the use of a high speed dynamic run-out testing apparatus of a kind described in any one of claims 1, 12 and 21, said method comprising the steps of:

rotating the cylindrical testpiece at high speed;

radiating a heat wave from an infrared radiating device to apply a thermal stress while the cylindrical testpiece is rotated at the high speed; and simultaneously therewith, measuring a radial displacement of the cylindrical testpiece by means of the first non-contact displacement detector.

* * * * *

UNITED STATES PATENT AND TRADEMARK OFFICE
CERTIFICATE OF CORRECTION

PATENT NO. : 5,864,238
DATED : January 26, 1999
INVENTOR(S) : Yasuo IIJIMA, et al.

It is certified that error appears in the above-indentified patent and that said Letters Patent is hereby corrected as shown below:

Col. 10, Line 25: "lash" should read --laser--.

Signed and Sealed this

Twenty-ninth Day of June, 1999

Attest:

Q. TODD DICKINSON

*Attesting Officer*    Acting Commissioner of Patents and Trademarks